United States Patent
Chiu et al.

(10) Patent No.: US 7,887,895 B2
(45) Date of Patent: Feb. 15, 2011

(54) OPTICAL DISC AND METHOD FOR FABRICATING THE SAME

(75) Inventors: Pei-Liang Chiu, Hsinchu (TW); Ting-Wei Yang, Hsinchu (TW); Chi-Pin Kuo, Hsinchu (TW)

(73) Assignees: Princo Corp., Hsinchu (TW); Princo America Corp,, Fremont, CA (US)

( * ) Notice: Subject to any disclaimer, the term of this patent is extended or adjusted under 35 U.S.C. 154(b) by 525 days.

(21) Appl. No.: 11/967,198

(22) Filed: Dec. 30, 2007

(65) Prior Publication Data
US 2009/0053454 A1 Feb. 26, 2009

(30) Foreign Application Priority Data
Aug. 21, 2007 (TW) ............... 96130848 A

(51) Int. Cl.
*B32B 3/02* (2006.01)

(52) U.S. Cl. .................. 428/64.1; 428/64.4; 430/270.1

(58) Field of Classification Search ........................ None
See application file for complete search history.

(56) References Cited

U.S. PATENT DOCUMENTS

| 5,757,765 | A | 5/1998 | Chen |
| 6,262,969 | B1 | 7/2001 | Ito et al. |
| 6,863,946 | B2 * | 3/2005 | Hisada et al. ............... 428/64.1 |
| 2004/0027967 | A1 * | 2/2004 | Takahashi et al. ........... 369/100 |
| 2005/0255283 | A1 * | 11/2005 | Yamada et al. ............. 428/64.4 |
| 2005/0270961 | A1 * | 12/2005 | Iida et al. ................. 369/272.1 |
| 2007/0098948 | A1 * | 5/2007 | Yang et al. ................. 428/64.4 |
| 2007/0127354 | A1 | 6/2007 | Lin |
| 2007/0173967 | A1 | 7/2007 | Kritchman et al. |

FOREIGN PATENT DOCUMENTS

DE 690 30 982 T2 10/1990

* cited by examiner

*Primary Examiner*—Elizabeth Mulvaney
(74) *Attorney, Agent, or Firm*—Pai Patent & Trademark Law Firm; Chao-Chang David Pai

(57) ABSTRACT

An optical disc includes an annular substrate, a coating layer, a damping layer, and a leveling layer. The annular substrate includes a supporting portion, and a recording portion surrounding the supporting portion, wherein the recording portion has a recording surface located on a first side thereof. For disc clamping and cost saving, the supporting portion is thicker than the recording portion. The coating layer is formed on the recoding surface for recording dada. The damping layer is formed on the coating layer to shorten the response time of the optical disc to vibration. The leveling layer is formed on the side of the annular substrate opposite to the recording surface for leveling the disk deformation caused during fabrication. A method for fabricating the aforementioned optical disc is also disclosed.

12 Claims, 3 Drawing Sheets

OPTICAL DISC AND METHOD FOR FABRICATING THE SAME

BACKGROUND OF THE INVENTION a) Field of the Invention

The invention relates to an optical disc and a method for fabricating the same. More particularly, the invention relates to an optical disc having a leveling layer capable of leveling disc deformation and a method for fabricating the same.

b) Description of Related Art

An optical disc can store data in different formats and is the most convenient storage medium among the optical storage media of the new generation. In addition, an optical disc can be used in many fields, including library archives, data backup, electronic publication, image data storage, and personal medical record management. To optical disc manufactures, it is important to lower the production cost of optical discs without sacrificing the read/write quality of optical discs.

PCT Publication No. WO/2006/116581 discloses an optical disc (referred to as "patent disc 1" hereinafter) having a supporting portion, a recording portion, and a protruding portion, wherein the lapped thickness of the protruding portion over the supporting portion is greater than the thickness of the recording portion. Unlike regular optical discs, which need to have additional compensation sheets to increase the thickness of the optical discs, the lapped regions of the patent disc 1 can be directly clamped by a disc drive. Therefore, patent disc 1 can be manufactured at reduced cost.

PCT Publication No. WO/2007/056074 discloses an optical disc capable of suppressing vibration while performing read/write, which is referred to as patent disc 2 hereinafter. The patent disc 2 has a damping layer for shortening the time the optical disc is affected by vibration. The damping layer is used to resolve the read/write problem of an optical disc caused when the optical disc vibrates at various speeds because of the tiny thickness or insufficient rigidity of the disc.

However, since the thickness of the recording portion of the aforementioned patent discs is about 0.55 mm to 0.65 mm, which is very thin, a recording portion of an annular substrate would deform and warp towards the side on which a coating layer and a damping layer are formed when the coating layer and/or the damping layer shrink due to material characteristics. It may become unable to perform read/write operations on the optical disc when the aforementioned deformation is severe. Therefore, it is important to resolve the deformation problem caused by a coating layer and/or a damping layer during fabrication.

BRIEF SUMMARY OF THE INVENTION

An object of the invention is to provide an optical disc for which the problem caused by the deformation of the optical disc due to shrinkage of a coating layer and/or a damping layer in during fabrication can be solved.

The invention provides an optical disc including: an annular substrate having a supporting portion and a recording portion surrounding the supporting portion, wherein the thickness of the supporting portion is greater than the thickness of the recording portion and the recording portion has a recording surface located on a first side thereof, a coating layer formed on the recording surface for recording data; a damping layer formed on the coating layer for shortening the response time to vibration of the optical disc; and a leveling layer formed on the side of the annular substrate opposite to the recording surface for leveling disc deformation caused during fabrication.

The invention also provides a method for fabricating an optical disc, and the method includes: fabricating an annular substrate having a supporting portion and a recording portion surrounding the supporting portion, wherein the thickness of the supporting portion is greater than the thickness of the recording portion and the recording portion has a recording surface located on a first side thereof, forming a coating layer on the recording surface for recording data; forming a damping layer on the coating layer for shortening the response time to vibration of the optical disc; and forming a leveling layer on the side of the annular substrate opposite to the recording surface for leveling disc deformation caused during fabricating.

The invention effectively lowers production cost of optical discs, suppresses disc vibration during read/write process, and reduces disc deformation caused during fabrication. In turn, the read/write characteristic of such optical disc is improved to approximately the same as that of regular optical discs, enabling such optical disc to be read/written normally by a regular disc drive.

DETAILED DESCRIPTION OF THE INVENTION

Figure 1A:
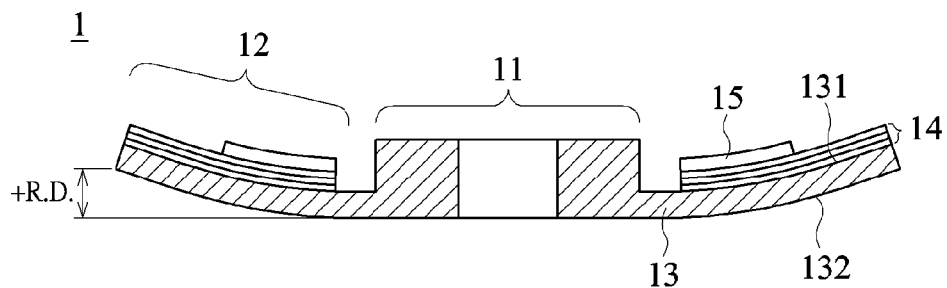
FIG. 1A is a structural schematic diagram illustrating an upward warpage deformation of an optical disc without a leveling layer.

An optical disc and a method for fabricating the same according to preferred embodiments of the invention will be described below with reference to the drawings, wherein like reference numerals denote like components.

Figure 4:
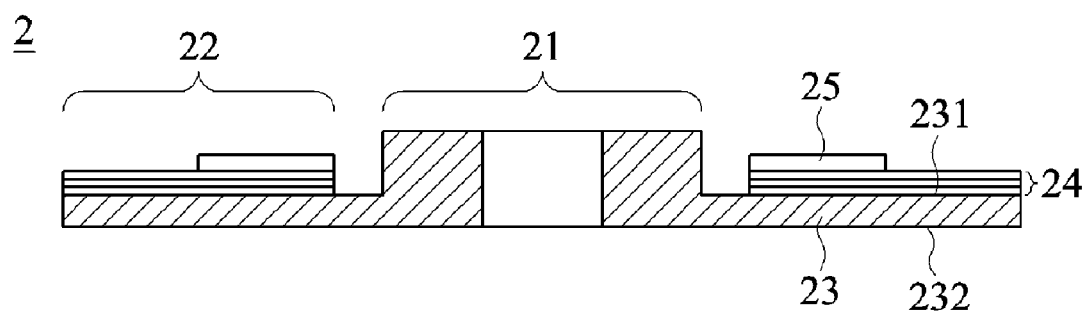
FIG. 4 is a structural schematic diagram of a conventional optical disc.

FIG. 4 is a structural schematic diagram of a conventional optical disc 2. The conventional optical disc 2 includes an annular substrate 23, a coating layer 24, and a damping layer 25. The annular substrate 23 has a supporting portion 21, a recording portion 22 surrounding the supporting portion 21, and a recording surface 231 located on a first side of the recording portion 22, wherein the thickness of the supporting portion 21 is greater than the thickness of the recording portion 22. The coating layer 24 is formed on the recording surface 231 for recording data, and the damping layer 25 is formed on the coating layer 24. Since the damping layer 25 is made of soft material, the damping coefficient of the optical disc 2 is increased, and thereby the duration that the optical disc 2 is affected by vibration is shortened as the ability of the optical disc 2 to resist vibration is enhanced.

Figure 3:
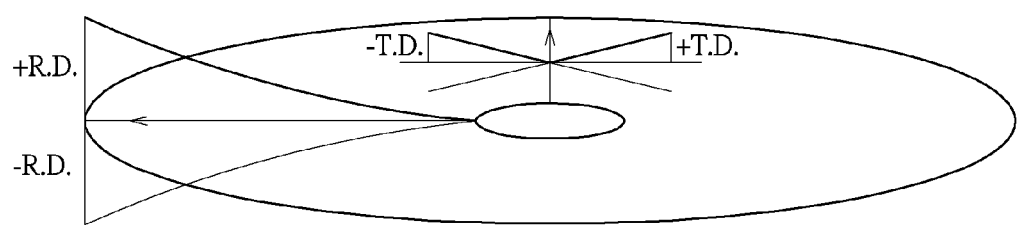
FIG. 3 is a schematic diagram illustrating deformation of an optical disc.

FIG. 3 is a schematic diagram illustrating the deformation of an optical disc. Disc deformation includes radial deviation (R.D.) and tangential deviation (T.D.). As shown in FIG. 3, when the optical disc warps upward, its R.D. is positive, and when it warps downward, its R.D. is negative. If a tangent angle of the optical disc deviates counter clockwise, T.D. of the optical disc is positive, and if it deviates clockwise, T.D. of the optical disc is negative. In general, an optical disc that can be read/written normally has an R.D. between about +0.80 degree and −0.80 degree and a T.D. between about +0.30 degree and −0.30 degree (specification range). In particular, R.D. has a crucial influence on the read/write performance of an optical disc. When R.D. exceeds the range of +1.00 degree to −1.00 degree, it is difficult to perform read/write on an optical disc.

Embodiment 1

Figure 1B:
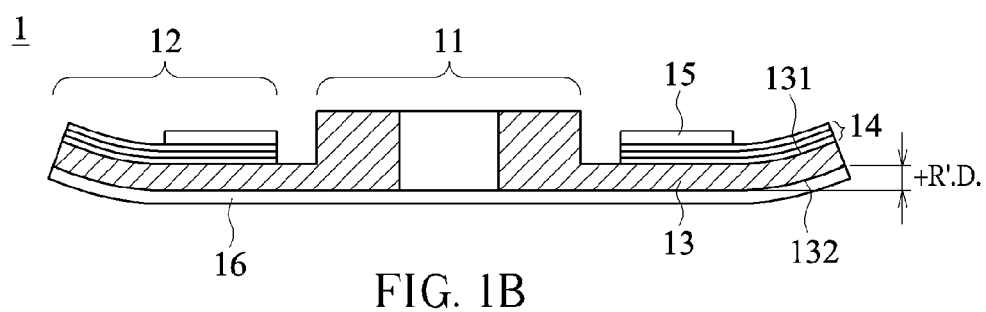
FIG. 1B is a structural schematic diagram illustrating reduced upward warpage deformation of the same optical disc as in FIG. 1A with a leveling layer according to an embodiment of the invention.

FIG. 1A is a structural schematic diagram illustrating an upward warpage deformation of an optical disc 1 without a leveling layer 16 and FIG. 1B is a structural schematic diagram illustrating a reduced warpage deformation of the same optical disc 1 with the leveling layer 16 according to an embodiment of the invention. The optical disc 1 includes an annular substrate 13, a coating layer 14, a damping layer 15, and a leveling layer 16. The annular substrate 13 has a supporting portion 11, a recording portion 12 surrounding the supporting portion 11, and a recording surface 131 located on a first side of the recording portion 12. The thickness of the supporting portion 11 is greater than the thickness of the recording portion 12 so as to enable a disc drive to directly clamp the optical disc 1 at the supporting portion 11 and thereby save the cost of adding compensation sheets. The coating layer 14 is formed on the recording surface 131 for recording data, and the damping layer 15 is formed on the coating layer 14 for shortening the response time to vibration of the optical disc 1.

As shown in FIG. 1A, the recording portion 12 of the annular substrate 13 has a tiny thickness around 0.55 mm to 0.65 mm, and therefore it would deform and warp towards the side with the coating layer 14 and the damping layer 15 formed thereon when the coating layer 14 and/or the damping layer 15 shrink due to material characteristics during fabrication. This deformation is marked as +RD.

Referring to FIG. 1B, the optical disc 1 is added with the leveling layer 16 formed on another surface 132 of the annular substrate 13 that is opposite to the recording surface 131. When the leveling layer 16 shrinks due to material characteristics, the disc deformation +RD caused by the coating layer 14 and/or the damping layer 15 during fabrication is leveled. The leveled deformation is marked as +R'D. Apparently, +R'D is smaller than +RD.

Embodiment 2

Figure 2A:
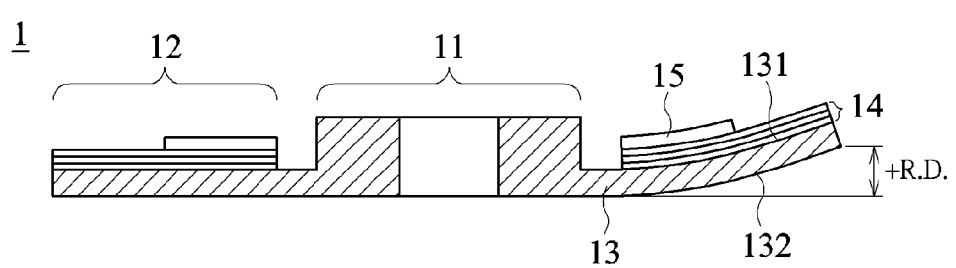
FIG. 2A is a structural schematic diagram illustrating an upward warpage deformation at part of the region of an optical disc without a leveling layer.
Figure 2B:
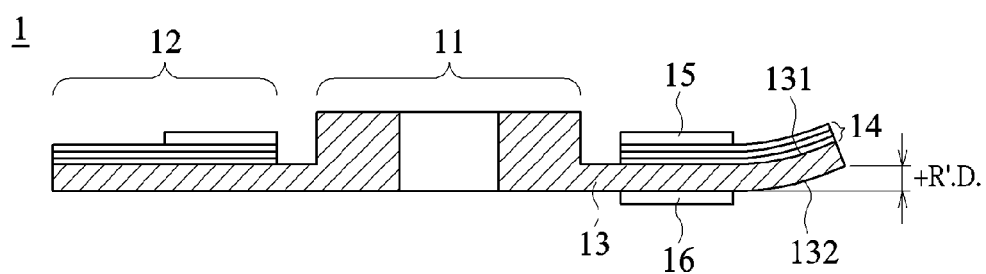
FIG. 2B is a structural schematic diagram illustrating an reduced upward warpage deformation at part of the region of the same optical disc as in FIG. 2A with a leveling layer according to an embodiment of the invention.

FIG. 2A illustrates the optical disc 1 without the leveling layer 16, being deformed and warped upward at part of the region, and FIG. 2B illustrates the optical disc 1 with the leveling layer 16 according to another embodiment of the invention, having reduced warpage deformation at the deformed region.

As shown in FIG. 2A, only the right half of the recording portion 12 is deformed and warped towards the side with the coating layer 14 and the damping layer 15 formed thereon. This deformation is marked as +RD.

Referring to FIG. 2B, the optical disc 1 is added with the leveling layer 16 formed on a part of the surface 132 that is on the side of the annular substrate 13 opposite to the recording surface 131, to level the disc deformation caused by the coating layer 14 and/or the damping layer 15 during fabrication from +RD to +R'D, wherein +R'D is smaller than +RD.

In the aforementioned embodiments, the extent to which disc deformation can be leveled by the leveling layer 16, namely the leveling effect of the leveling layer 16 on the disc deformation, is affected by factors like material characteristics, position, range, thickness of the leveling layer 16. Therefore, the material, position, range, and thickness of the leveling layer 16 can be suitably adjusted in consideration of the size of the deformed region and the extent of disc deformation, in order to achieve the desirable leveling effect for the deformation.

TABLE 1

| | | Radial Deviation (Degree) | | Tangential Deviation (Degree) | |
|---|---|---|---|---|---|
| Item | | Average Max. | Average Min. | Average Max. | Average Min. |
| a. | Regular DVD-R disc | 0.14 | −0.20 | 0.06 | −0.06 |
| b. | Patent disc 1 | 0.95 | 0.04 | 0.14 | −0.12 |
| c. | Patent disc 1 + leveling layer | 0.19 | −0.34 | 0.18 | −0.13 |
| d. | Patent disc 2 | 2.37 | 0.53 | 0.19 | −0.10 |
| e. | Patent disc 2 + leveling layer | 1.83 | 0.26 | 0.20 | −0.14 |

Table 1 shows experiment data relating to the leveling effect of the leveling layer according to the invention. Five types of optical discs are selected for the experiment: a. regular optical disc, b. patent disc 1, c. patent disc 1 with a leveling layer, d. patent disc 2, and e. patent disc 2 with a leveling layer. For each type of optical disc, five sheets of optical disc are used in the experiment. For each sheet of optical disc, the maximum and minimum of R.D. and T.D. are measured and then the average maximum and minimum values of the five sheets of optical disc of the same type are recorded. The closer to zero the average maximum and the average minimum values are, the smaller the deformation is, and the more flat the optical disc is, and the better the read/write characteristics are.

The data for items a, b, and c in Table 1 indicate that the average maximum and the average minimum T.D. of each item are within the specification range (+/−0.3 degree) in which an optical disc can be read/written normally by a disc drive. The average maximum and the average minimum R.D. of the regular optical disc are respectively 0.14 degree and −0.20 degree, which are within the specification range (+/−0.8 degree) as well. After adding the leveling layer, the average maximum R.D. of the patent disc 1 is improved from 0.95 degree to 0.19 degree, but the average minimum R.D. of the patent disc 1 slipped slightly from 0.04 to −0.34 degree. However, that is about the same degree of deviation suffered by the regular optical disc and is still within the normal specification range (+/−0.8 degree) in which an optical disc can be read/written normally. Thus, the leveling layer does effectively reduce the R.D. of the patent disc 1. In addition, it was found after the experiment that the optical disc of item c can be read/written by a regular optical disc drive.

It can be seen from the data for items d and e in Table 1 that the average maximum and the average minimum T.D. of each item are within the specification range (+/−0.3 degree) for an optical disc to be read/written normally. With the leveling layer, the T.D. of the patent disc 2 was improved from 2.37 degree to 1.83 degree for the average maximum T.D. and from 0.53 degree to 0.26 degree for the average minimum T.D. Although the deviation of the patent disc 2 with the leveling layer is not as small as regular optical discs and is outside of the specification range (+/−0.8 degree) for an optical disc to be read/written normally, the leveling layer does effectively reduce R.D. of the patent disc 2. Moreover, it is also found that the optical disc of item e can be read/written normally by a regular disc drive according to our testing.

The patent disc 2, the R.D. of which exceeds the specification range, can be read/written normally because the structure of the patent disc 1 and the patent disc 2 described by the invention differ from that of regular optical discs. According to our further testing, it is found that the R.D. of the patent discs are mostly positive values and are smaller during high-speed revolutions due to centrifugal force, that is, the static R.D. is greater than the dynamic R.D. When the patent discs are actually tested in disc drives, they can be normally read/written even with a static R.D. of about +3.0 degree, though the read/write characteristics are less satisfactory. Therefore, the R.D. values of the patent discs still need to be lowered. From the aforementioned tests, it is evident that, by adding the leveling layer, the R.D. values of the patent discs 1 and 2 are effectively lowered, and in turn the read/write characteristics are improved.

As to the material suitable for the leveling layer of the optical disc according to the invention, there is no specific limitation thereto. However, in consideration of scratch-resistance, antistatic, prevention of deformation or static accumulation due to moisture or temperature, oil/water resistance, or handprint staining, film material such as UV-curing resin film, silica film, diamond-like carbon film, magnesium fluoride film, or fluoride coating film are suitable for such purposes. Furthermore, if we consider the ease in using mixed composition to derive a desirable leveling effect, UV-curing resin film is a preferred choice of material. Moreover, the leveling layer can be formed by any process suitable for the selected material, such as: printing, coating, sputtering, vacuum deposition, or chemical vapor deposition, there is no specific limitation thereto. The leveling layer is preferred to have a thickness between 1 μm and 600 μm.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An optical disc comprising:
   an annular substrate having a supporting portion and a recording portion surrounding the supporting portion, wherein the thickness of the supporting portion is greater than the thickness of the recording portion, and the recording portion has a recording surface located on a first side thereof;
   a coating layer formed on the recording surface for recording data;
   a damping layer formed on the coating layer for shortening the response time to vibration of the optical disc; and
   a leveling layer formed on a side of the annular substrate opposite to the recording surface for leveling disc deformation caused during fabrication, wherein the leveling layer is made of UV-curing resin film, diamond-like carbon film, magnesium fluoride film, or fluoride coating film.

2. The optical disc as described in claim 1, wherein the leveling layer is formed on a part of the side of the annular substrate opposite to the recording surface.

3. The optical disc as described in claim 1, wherein the leveling layer is formed by printing, coating, sputtering, vacuum deposition, or chemical vapor deposition.

4. The optical disc as described in claim 2, wherein the leveling layer is formed by printing, coating, sputtering, vacuum deposition, or chemical vapor deposition.

5. The optical disc as described in claim 1, wherein the leveling layer has a thickness between 1 μm and 600 μm.

6. The optical disc as described in claim 2, wherein the leveling layer has a thickness between 1 μm and 600 μm.

7. A method for fabricating an optical disc, comprising:
   fabricating an annular substrate having a supporting portion and a recording portion surrounding the supporting portion, wherein the thickness of the supporting portion is greater than the thickness of the recording portion, and the recording portion has a recording surface located on a first side thereof;
   forming a coating layer on the recording surface for recording data;
   forming a damping layer on the coating layer for shortening the response time to vibration of the optical disc; and
   forming a leveling layer on a side of the annular substrate opposite to the recording surface for leveling disc deformation caused during fabrication, wherein the leveling layer is made of UV-curing resin film, diamond-like carbon film, magnesium fluoride film, or fluoride coating film.

8. The method as described in claim 7, wherein the leveling layer is formed on a part of the opposite side of the annular substrate.

9. The method as described in claim 7, wherein the leveling layer is formed by printing, coating, sputtering, vacuum deposition, or chemical vapor deposition.

10. The method as described in claim 8, wherein the leveling layer is formed by printing, coating, sputtering, vacuum deposition, or chemical vapor deposition.

11. The method as described in claim 7, wherein the leveling layer has a thickness between 1 μm and 600 μm.

12. The method as described in claim 8, wherein the leveling layer has a thickness between 1 μm and 600 μm.

* * * * *